May 17, 1955

C. B. ROBERTS 2,708,552

REFUSE CUTTING MACHINE

Filed April 3, 1952

INVENTOR.
Charles B. Roberts
BY
Asher, Freedman & Ryman,
Attorneys.

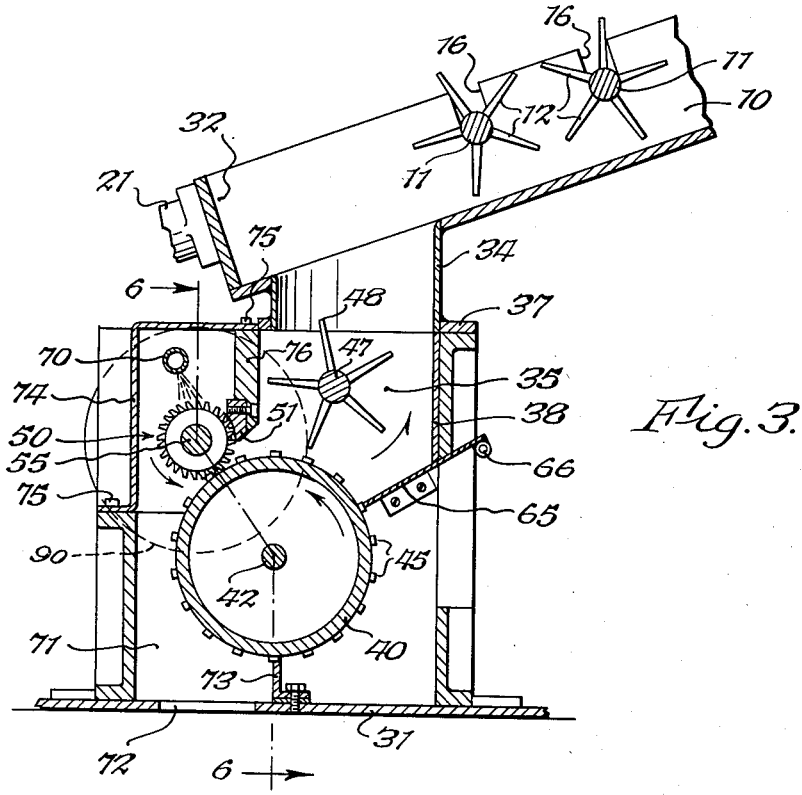
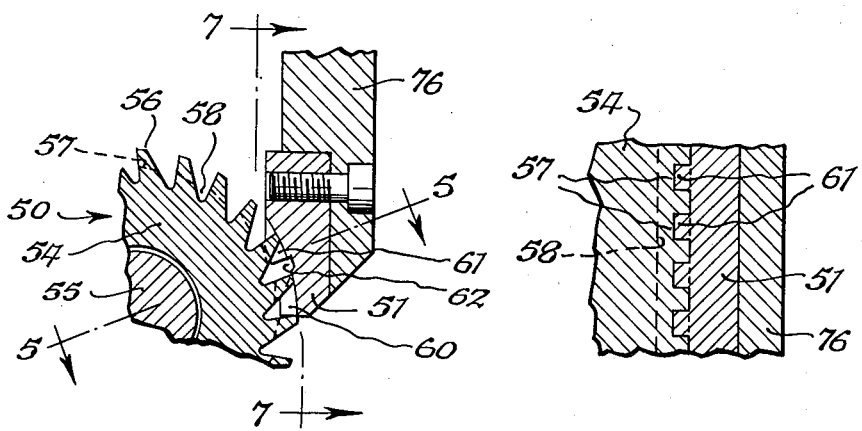

May 17, 1955

C. B. ROBERTS 2,708,552

REFUSE CUTTING MACHINE

Filed April 3, 1952

INVENTOR.
Charles B. Roberts,
BY
Parker, Prodmore & Parner,
Attorneys.

United States Patent Office 2,708,552
Patented May 17, 1955

2,708,552

REFUSE CUTTING MACHINE

Charles B. Roberts, Lockport, N. Y., assignor to F. W. Roberts Manufacturing Company, Lockport, N. Y.

Application April 3, 1952, Serial No. 280,287

8 Claims. (Cl. 241—38)

This invention relates to improvements in apparatus for cutting refuse into small particles that may be readily disposed of.

In the poultry industry the disposal of feathers and other refuse from poultry constitutes a serious disposal problem. At the present time poultry is generally plucked by means of machines which remove the feathers rapidly so that large quantities of poultry can be defeathered in a relatively short time, consequently, producing large quantities of feathers and other refuse. This material, particularly when wet, tends to become matted into lumps or masses which make the refuse very difficult to handle and also make it impossible to discharge this refuse into sewers, since this type of material will rapidly plug up sewer pipes, traps, etc. Furthermore, this material has a tendency to rot or decay rapidly, and then gives off extremely offensive odors. Consequently, a rapid disposal of the feathers and other waste material from poultry is very essential.

One of the objects of this invention is to provide a machine which can readily handle poultry and other refuse and reduce the same to particles of a size that can readily be flushed down a sewer.

Another object of this invention is to provide a machine of this type with feed means constructed to supply the material to be disposed of in substantially uniform quantities to the cutting devices.

A further object is to provide a machine of this kind with means for breaking up compacted masses of material of this kind so that the same may be readily fed to the cutting devices.

It is a further object of this invention to provide a machine of this type in which the feed mechanism which feeds material to the cutting mechanism also acts to break up lumps or compacted masses of the material before the same enters the cutting devices.

Another object is to provide a machine which is so constructed as to greatly reduce the possibility of damage to parts of the cutting mechanism due to the presence of stones or other hard materials which may enter the machine.

It is also an object of this invention to provide cutting devices which are so constructed that they will cut feathers or other materials into lengths of predetermined sizes regardless of the angle at which they extend while passing to the cutters.

Another object is to provide cutters of this type of improved construction and which may be readily removed from and replaced in the machine as a unit for resharpening, replacement, or adjustment.

A further object is to provide a machine with a feed chamber in which lumps or matted masses of the material to be cut are broken up or disintegrated and in which this material is then deposited in controlled quantities on a feed drum for feeding material to the cutting means.

Other objects and advantages will be apparent from the following description of one embodiment of the invention and the novel features will be particularly pointed out hereinafter in connection with the appended claims.

In the accompanying drawings:

Fig. 3 is a longitudinal, sectional elevation thereof, on line 3—3, Fig. 2.

Fig. 4 is a fragmentary sectional view, on an enlarged scale, of the cutting mechanism of the machine.

Fig. 5 is a fragmentary, sectional view thereof, on line 5—5, Fig. 4.

Figure 1:
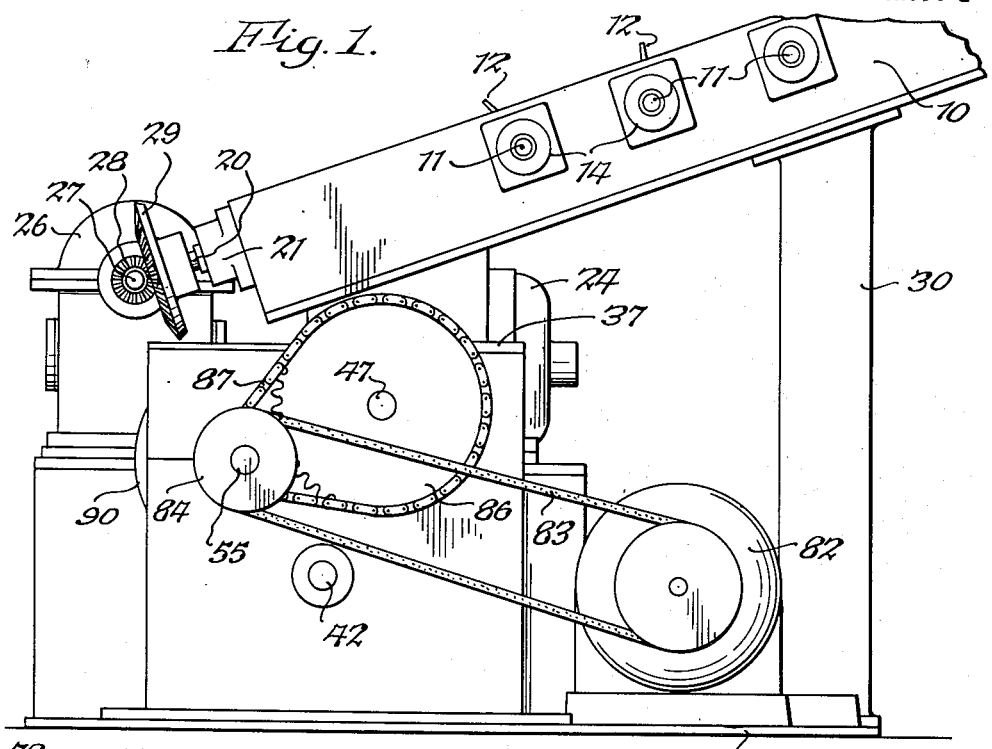
Fig. 1 is a side elevation of a cutting machine embodying this invention.

In accordance with my invention, one embodiment of which is shown by way of example in the drawings, I have provided a machine by means of which feathers and other refuse can be quickly and efficiently cut into particles small enough so that they can be flushed down a sewer. Because of the nature of this material and its tendency to become matted into lumps and relatively large masses, it has not been possible with cutting machines heretofore available to cut this material into particles separated from each other and of small sizes that can be readily flushed down a sewer without plugging the same, and to do so speedily and efficiently, so that the material need not be allowed to accumulate before being passed to the machine and with the necessary speed in machines or apparatus heretofore available.

Figure 2:
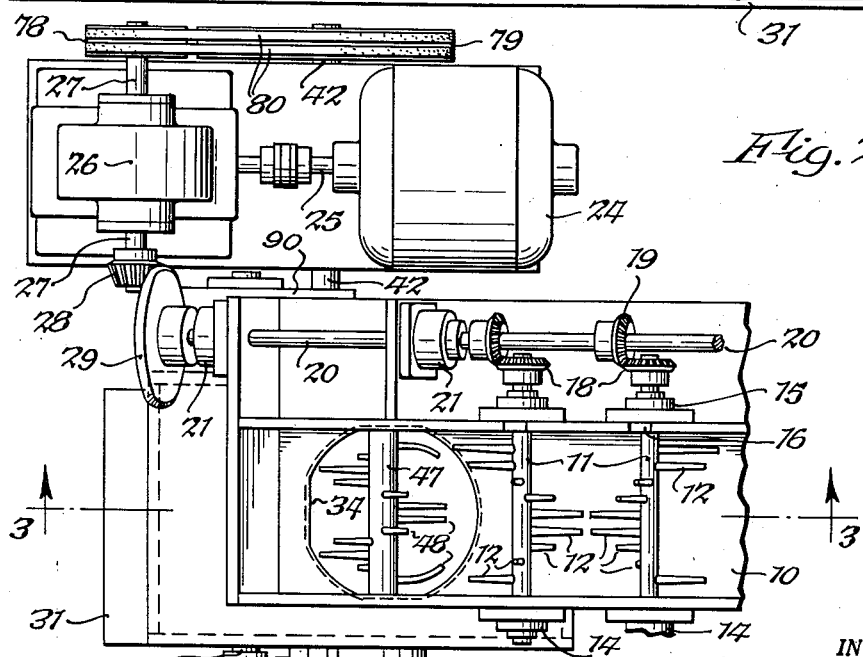
Fig. 2 is a top plan view thereof.

My improved machine includes a conveyor to which the feathers, poultry refuse or other materials may be fed, preferably directly from the defeathering machines. This conveyor includes an inclined trough 10 of any suitable or desired construction along which the material may be fed, partly by gravity, to the cutting devices. The inclination of the trough, however, is not sufficient to permit the material to be fed by gravity only, and consequently, a plurality of rotary forks are provided in the trough, each fork including a rotary shaft 11 from which tines 12 radiate. The tines preferably taper or converge toward the outer ends thereof so as to overcome the tendency of the material to adhere to the tines. These forks are so mounted on the trough 10 that the tines 12 are in their lowest positions, their outer ends will be in spaced relation to the bottom of the trough. These forks may be driven in any suitable or desired manner so that the tines at the lower portions of the fork will tend to feed the material in the bottom of the trough downwardly along the trough. The rotary forks, consequently, revolve in a clockwise direction as seen in Figs. 1 and 3, and the tines are preferably disposed about the shafts 11 so that they extend outwardly from the shafts in various directions, as shown in Fig. 2. These rotary forks break up the lumps of material which pass down along the trough 10 and also regulate the quantity of material that is fed to the lower end of the trough. If an excess quantity of material reaches a rotary fork, a portion of this material will be carried by the tines over the shaft 11 of the fork and discharged in rear of the fork, thus permitting only a predetermined quantity of material to pass downardly along the trough.

Any desired number of these rotary forks may be employed lengthwise of the trough and any suitable or desired means may be provided for driving these forks. In the construction shown, the forks are journaled in suitable bearings 14 and 15 at opposite sides of the trough and preferably mounted on the side walls thereof. One or both of the side walls of the trough may be provided with slots 16 through which the shafts 11 may extend, the slots facilitating the removal from and replacing of the shafts 11 in the trough.

The shafts 11 of the rotary forks project at one end beyond an upright side wall of the trough and are provided on these end portions with bevel pinions 18 which are arranged to mesh with bevel gears 19 secured on a shaft 20 extending along a side of the trough in spaced relation thereto. The shaft 20 may be suitably journalled at intervals along their lengths, two bearings 21 being shown in Fig. 2, but it will be obvious that additional bearings may be provided.

The shaft 20 is driven at a relatively slow speed from a suitable source of power, such as an electric motor 24, Fig. 2, having its shaft 25 connected with a speed reducing device 26 of any suitable construction. This speed reducing gear has a shaft 27 provided with a bevel gear 28 positioned to mesh with a bevel gear 29 secured on the end of the shaft 20. It will thus be obvious that by power derived from the motor 24, the shaft 20 will be rotated in such a manner as to rotate the forked shafts 11 at a slow rate of speed sufficient to ensure a proper feed of the material to the machine. The trough may extend at a considerable distance beyond the machine and may be supported by means of an upright column or standard 30, the lower part of which is suitably mounted on a base 31 of the machine.

The lower end of the trough in the construction shown terminates in an upright end wall 32 which extends outwardly beyond one side wall of the trough and also constitutes a support for one of the bearings 21 for the shaft 20.

In close proximity to its lower end, the bottom of the trough 10 is provided with a suitable aperture which connects with a down chute 34 through which the material from the trough is discharged into a feed chamber 35 suitably formed in the frame of the machine. This frame includes upright side walls 36 secured to and extending upwardly from the base 31 and forming a box-like structure within which the various parts of the machine are arranged. The machine also includes a top wall 37 which is provided with an opening connecting with the down chute 34, this chute being of substantially cylindrical form.

Within the upper portion of the frame of the machine is arranged the feed chamber 35 being enclosed partly by means of a wall 38, Fig. 3. The chute 34 discharges material into the upper end of this feed chamber. Also arranged within the frame of the machine is a feed drum or cylinder 40, Figs. 3 and 6, which has end walls 41 secured on a shaft 42 journalled in bearings 43 suitably secured to opposite side walls 36 of the frame of the machine. The feed drum or cylinder 40 is provided with short outwardly projecting studs or teeth 45 hereinafter more fully described. This feed drum forms a part of the bottom of the feed chamber 35.

Lumps of the material fed to the machine are partly broken up by means of the rotary rakes operating in the feed trough 10, but I have found that further breaking up of the material is necessary, and for this purpose I provide in the feed chamber 35 a rotatable spinner or beater including a shaft 47 on which tines or arms 48 are mounted. The shaft 47 extends crosswise of the feed chamber 35 and the tines or arms 48 are so shaped as shown in Fig. 2, that they will extend into different portions of the feed chamber. For this purpose, some of the tines may be bent so that their outer ends conform somewhat to the periphery of the down chute 34 shown in Fig. 2. The shaft of the spinner or beater is preferably revolved rapidly in the direction shown by the arrow in Fig. 3, the tines or arms also extending into fairly close proximity to the feed drum or cylinder 40, which is rotated in the direction indicated by the arrow in the cylinder 40, Fig. 3. The beater shaft 47 is journalled on opposite side walls 36 of the frame of the machine. This beater or spinner serves the further purpose of preventing arcing over or bridging of the material in the feed chamber, thus ensuring continuous feed of the material to the feed cylinder.

The feed drum or cylinder 40 feeds materials from the feed chamber 35 to a rotary cutter 50 which has outwardly extending cutter teeth cooperating with the teeth of a stationary cutter member 51. The rotary cutter rotates in a counterclockwise direction, as seen in Fig. 3, and the teeth of the cutter extend into close proximity to the feed drum or cylinder 40 so as to pick up material carried to the left in Fig. 3 by the upper surface of the feed drum. The ends of the tines 48 of the spinner or beater move past the surface of the feed drum in such a manner that the direction of movement of the tines 48 is opposite to that of the studs 45. Consequently, the spinner or beater serves to remove from the feed drum any material in excess of that which can readily be received by the rotary cutter 50, and if any large lumps or masses of material are being carried by the feed drum 40, the arms 48 of the beater will remove such large masses from the feed drum. Because of the rapid rotation of the spinner or beater, the arms 48 of the same will readily break up such large masses and hurl them away from the feed cylinder toward the opposite wall of the feed chamber 35 for further breaking up.

The revolving cutter 50 includes a rotary toothed member or rotor 54 suitably mounted on a shaft 55. This rotor is provided with outwardly extending cutting teeth 56 and additional cutting surfaces 57 arranged between adjacent teeth. These teeth are preferably arranged in rows extending generally lengthwise or spirally of the rotor 54, those shown by way of example extending lengthwise of the rotor. These teeth as shown for example, may be made by cutting or otherwise forming grooves 58 extending approximately lengthwise of the peripheral surface of the rotor, and also cutting or forming circumferential grooves which intersect the grooves 58 and are of approximately one-half of the depth of the grooves 58, the bottoms of these grooves being indicated at 57 in Figs. 4 and 6. The longitudinal grooves form longitudinal ridges on the rotor 54, and the circumferential grooves form the ridges into longitudinally extending rows of teeth 56. The outer ends or tops of these teeth preferably have substantially straight cutting edges and straight substantially parallel sides, their cutting edges being formed on the leading edges of the tops and sides of the teeth. The portions 57 of the ridges extending between adjacent teeth also have their leading edges sharpened for cutting.

The stationary cutting member 51 is provided with two rows of teeth 60 and 61 arranged in spaced relation to each other. The teeth 60 are of such width as to fit closely into the spaces formed by the circumferential grooves between the teeth 56 of the rotary cutter. The height of the teeth 60 on the stationary cutter is such that the outer ends of the same extend into close proximity to the cutting edges 57 of the rotor. Preferably a groove 62 is provided between the two sets or rows of stationary teeth 60 and 61, the groove being formed to extend into the stationary cutter 51 beyond the bottoms of the teeth 60 and 61, and the outer edge of this groove is sharpened to cooperate with the outer edges of the teeth 56 of the rotor. The sides, ends, and spaces between the teeth of the stationary cutter, consequently, operate in shearing relation to the teeth of the rotary cutter.

By means of the construction shown, cooperating cutting edges are formed at the sides of the teeth 60 and 61 of the stationary cutter and the sides of the teeth 56 of the rotor. Additional cutting edges are formed between the outer edge portions of the stationary teeth 60 and 61 and the cutting surfaces 57 of the rotor. By providing the groove 62 in the stationary cutter, it will be obvious that cutting surfaces will be formed between the teeth 61 of the stationary cutter. Also the spaces between the leading edges of the bottoms of the teeth 60 of the stationary cutter will provide cutting edges with which the ends of the teeth 56 of the rotor will cooperate. In view of this arrangement of the cutting teeth, it will be obvious that feathers or other material which is passed between the teeth of the rotary cutter in a general direction lengthwise of the axis of rotation of this cutter will be cut by the cooperating edges of the sides of the teeth of the rotary and stationary cutters. If any feathers or other material pass into the spaces between the teeth of the rotary cutter in a direction substantially radial with reference to the axis of rotation of the rotary cutter, such feathers will be cut by the cooperating cutting edges of the outer ends of the teeth 56 and the spaces between the teeth of the stationary cutter, and also by the cutting edges formed at the ends of the teeth of the stationary cutter and the cutting edges 57 of the rotary cutter. Any feathers or other material fed to the rotor at angles other than parallel with or radial to the axis of rotation of the rotor may be cut by both radial and circumferential cutting edges of the rotary and stationary cutters. Consequently, by means of this arrangement, feathers and the like will be cut into short pieces regardless of the angle at which they are presented to the teeth of the cutters. A flywheel 90 is preferably secured on the shaft 55 of the rotary cutter.

By arranging the teeth of the rotor and the stationary cutting member in close proximity to each other as shown in Fig. 5, it will be obvious that all material, whether cut or too short to be cut, will be conveyed by the rotor teeth out of the feed chamber 35.

Referring again to the studs or projections 45 on the feed drum or cylinder 40, the outer ends of these studs are cut with parallel sides of such width as to pass between the teeth 56 of the rotary cutter, or in other words, to extend into the annular grooves formed on the rotary cutter. Consequently, material fed by the studs of the feeding drum will be readily picked up by the teeth of the rotary cutter and moved upwardly to the stationary cutter where they will be cut into small pieces. It is possible, of course, that stones or other hard objects may be fed by these studs 45 to the rotor, but because of the direction of rotation of this rotor, such stones or other hard objects which might damage the cutting teeth are thrown by the teeth of the rotary cutter or rotor back into the feed chamber 35 where the tines or arms 48 of the spinner or beater will tend to move such stones or articles to the right in Fig. 3. Such articles will, consequently, because of their weight, settle upon a cleanout slide or door 65 which also forms a part of the bottom of the feed chamber 35. This door may be removably mounted in any suitable manner, for example, by hinging the same at 66, shown at Fig. 3, so that stones or other hard objects may be removed from the feed chamber from time to time.

Figure 6:
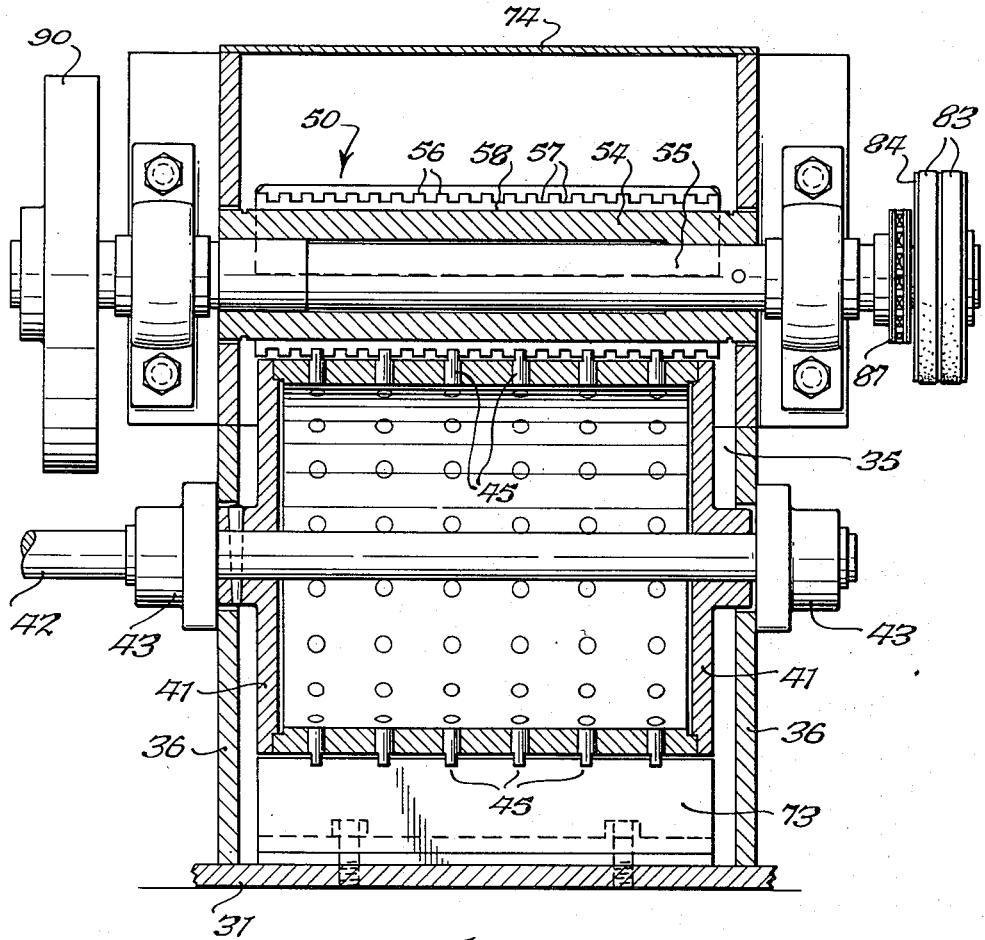
Fig. 6 is a sectional elevation thereof, also on a larger scale, on line 6—6, Fig. 3.
Figure 7:
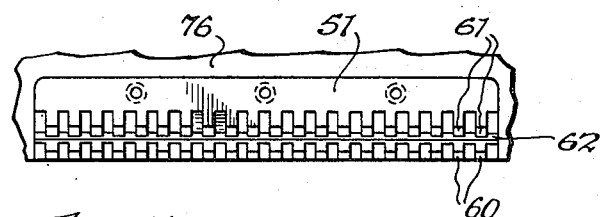
Fig. 7 is a fragmentary elevation, taken approximately on line 7—7, Fig. 4.

In order to keep the rotary cutter clean and remove cut material therefrom, a spray pipe 70 is preferably provided in the machine which directs sprays of water against the teeth of the rotary cutter. This water serves not only to remove cut material from the rotary cutter, but also to flush the cut material downwardly through a discharge chamber 71 in the machine and out through an opening 72 in the base plate 31. A considerable volume of water is preferably provided so that this cut material may be passed through the opening 72 directly to a sewer. A partition 73 extends upwardly from the base 31 into close proximity to the feed cylinder 40 and constitutes a wall of the discharge chamber 71. This partition, as shown in Fig. 6 is provided with notches in the upper edge thereof through which the projections 45 of the feed cylinder pass. The partition 73 therefore serves the further purpose of removing or scraping from the projections 45 feathers or other material which has become attached thereto or entangled therewith and which cannot be removed merely by the water splashed against the same.

Some of the water discharged against the rotary cutter will be deflected against the portion of the feed drum 40 which is below the cutter, and thus remove from this drum any small particles of material which have not been removed from the same by the rotary cutter.

I have also provided means for facilitating the removal of the rotary and stationary cutters from the machine for replacing or repairing. In the construction shown for this purpose, these parts together with the spray pipe 70 are mounted on an angle-shaped removable part 74 of the frame of the machine and which may be suitably secured to the frame in any desired manner, for example, by means of bolts or screws 75. The stationary cutter 51 is removably mounted on the lower end of a wall or partition 76 which is also mounted on the removable frame part 74 and also forms a wall of the feed chamber 35. When the frame part 74 is removed from the machine, the rotary and stationary cutters are readily accessible and may be adjusted relatively to each other, as required. They may also be re-sharpened when necessary and placed into correct relation to each other before being again inserted into the machine. The stationary cutter 51 is removably mounted on the partition wall 76 and as the teeth of the cutters wear down, the stationary cutter 51 may, for example, be moved into closer proximity to the rotary cutter by the use of shims or the like between the stationary cutter and partition wall 76.

It will be noted that the lower end of the partition wall 76 and the stationary cutter 51 are arranged in spaced relation to the feed drum 40, and preferably the lower edges of the stationary cutter and of this partition are inclined upwardly. This arrangement provides a space between the feed drum and the partition 76 through which hard objects engaged by the teeth of the rotary cutter will be deflected back into the feed chamber. It will also be noted that when the frame part 74 with the partition 76 is removed, the interior of the feed chamber is readily accessible.

The various rotating parts of the machine may be driven in any suitable or desired manner. Preferably, the shaft 42 of the slowly rotating feed drum 40 is driven from the speed reducing gear 26, as shown in Fig. 2. The shaft 27 of this gear is provided at one end thereof with a pulley 78 and the shaft 42 is provided with another pulley 79 connected with the pulley 78 by belts 80.

The shaft 55 of the rapidly revolving rotary cutter is preferably driven from another motor 82, Fig. 1, which drives a belt 83 cooperating with a pulley 84 mounted on the shaft 55 of the rotary cutting member.

The shaft 47 of the spinner or beater is provided at the outer end thereof with a sprocket wheel 86 which is driven by a sprocket chain 87 from a smaller sprocket wheel mounted on the rotary cutter shaft 55.

By means of the construction illustrated, complete cutting of the refuse material is effected and the machine is speedy and efficient in its operation and has no tendency to clog.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A refuse cutting machine including a feed chamber for receiving material to be cut, a cutting device including a stationary cutter having outwardly extending teeth and a rotary cutter having teeth extending between and into cutting relation to the teeth of said stationary cutter, the teeth of said cutters being provided with cutting edges on the sides and outer end portions thereof and the teeth of said rotary cutter extending into shearing relation to the teeth of said stationary cutter, each of said cutters being provided between the teeth thereof with cutting edges extending into shearing relation to the ends of the teeth of the other cutter, the teeth of said stationary cutter being arranged in two longitudinal rows arranged substantially parallel to the axis of said rotary cutter, and a groove between said rows of teeth, an edge of said groove being sharpened to cooperate with the ends of the teeth of said rotary cutter to produce a shearing action.

2. A refuse cutting machine including a frame having a feed chamber formed therein, a trough leading to said feed chamber, a plurality of rotary rakes having shafts extending crosswise of said trough and having tines extending into proximity to the bottom of said trough, said rakes being arranged at intervals lengthwise of said trough, and controlling the feed of material in said trough to said feed chamber, a rapidly revolving beater in said feed chamber having outwardly extending arms which break up lumps of material within said feed chamber, a rotary feed cylinder forming a part of the bottom of said feed chamber, said beater having arms extending into proximity to said cylinder and controlling the depth of material deposited on said cylinder, a cutting device including a toothed stationary cutter and a rotary cutter having outwardly extending teeth passing between the teeth of said stationary cutter, said teeth of said rotary cutter extending into close proximity to the periphery of said cylinder for removing material from said cylinder and carrying the same into position to be cut by the teeth of said stationary and rotary cutters, means for directing a spray of water to the portion of said rotary cutter which is passed by said stationary cutter for removing cut material therefrom, and a discharge chamber into which the water and cut material is discharged, a portion of said cylinder extending into said discharge chamber, the teeth of said rotary member deflecting water against the portion of said feed cylinder which is in said discharge chamber, for removing refuse material therefrom.

3. A refuse cutting machine including a frame having side and end walls, a feed chamber arranged within said frame, a rotary beater in said feed chamber, a feed cylinder on which material from said feed chamber is deposited, a cutting device including a toothed stationary cutter and a rotary cutter having teeth extending outwardly therefrom into position to pass between the teeth of said stationary cutter, the teeth of said rotary cutter extending into close proximity to said feed cylinder to remove material therefrom and carry the same into cutting relation to the teeth of said stationary cutter, and a partition removably mounted on said frame and forming a part of the wall of said feed chamber, said stationary cutter being secured on said partition and removable therewith from said machine.

4. A refuse cutting machine including a frame having side and end walls, a feed chamber arranged within said frame, a rotary beater in said feed chamber, a feed cylinder on which material from said feed chamber is deposited, a cutting device including a toothed stationary cutter and a rotary cutter having teeth extending outwardly therefrom into position to pass between the teeth of said stationary cutter, the teeth of said rotary cutter extending into close proximity to said feed cylinder to remove material therefrom and carry the same into cutting relation to the teeth of said stationary cutter, said frame including a removable part on which said rotary cutter is mounted, and a partition on which said stationary cutter is mounted, said partition being secured to said removable frame part and also forming a part of the wall of said feed chamber, said frame part when removed from said frame affording access to said feed chamber.

5. A refuse cutting machine including a frame having side and end walls, a feed chamber arranged within said frame, a rotary beater in said feed chamber, a feed cylinder forming a part of the bottom of said feed chamber, a cutting device including a rotary cutter having teeth extending into close proximity to said cylinder to pick up material therefrom to be cut, a stationary cutter to which material from said cylinder is carried upwardly by said rotary cutter, said stationary cutter being arranged in spaced relation to said cylinder to form a space through which hard objects may be deflected from said cylinder back into said feed chamber, and a plate forming a part of the bottom of said feed chamber and movable into a position to discharge said hard objects from said feed chamber.

6. A refuse cutting machine including a frame having side, end, and top walls, a partition secured to said frame and extending downwardly into said machine, said partition constituting a wall of a feed chamber arranged in the upper portion of said machine, a feed cylinder having a portion of the surface thereof forming a bottom wall of said feed chamber, a cutting device including a stationary cutter attached to the lower end of said partition and having cutting teeth, a rotary cutter having outwardly extending teeth extending into shearing relation to the teeth of said stationary cutter, said rotary cutter being arranged in close proximity to said feed cylinder and picking up material to be cut from said feed cylinder and carrying the same into shearing relation to said stationary cutter, spray means projecting water on said rotary cutter to remove cut material therefrom, a discharge chamber into which water and cut material pass from said rotary cutter, and an upwardly extending partition in the lower portion of said frame and which constitutes a wall of said discharge chamber and which extends into close proximity to said feed cylinder to remove material adhering thereto and to discharge the same into said discharge chamber.

7. A refuse cutting machine according to claim 6, and including outwardly extending projections on said feed cylinder which pick up material to be cut from said feed chamber and which are formed to pass between teeth of said rotary cutter, said last mentioned partition having notches in the upper surface thereof through which said projections of said feed cylinder pass, for removing material adhering thereto.

8. A refuse cutting machine including a feed chamber for receiving the material to be cut, a rotary and a stationary cutter having cooperating cutting teeth, and a feed cylinder extending across a part of the bottom of said feed chamber and having outwardly extending projections and which receives material to be cut and moves the same to said rotary cutter, the peripheral portions of said rotary cutter extending into close proximity to said cylinder and the projections of said cylinder passing between teeth of said rotary cutter, whereby said teeth of said rotary cutter pick up material from said cylinder and pass the same to said stationary cutter.

References Cited in the file of this patent

UNITED STATES PATENTS

| | | |
|---|---|---|
| 387,438 | Parker | Aug. 7, 1888 |
| 529,796 | Johnson | Nov. 27, 1894 |
| 2,141,662 | Ossing et al. | Dec. 27, 1938 |
| 2,171,949 | Roca et al. | Sept. 5, 1939 |
| 2,471,356 | Slick | May 24, 1949 |
| 2,554,071 | Strawn | May 22, 1951 |
| 2,670,774 | Higer | Mar. 2, 1954 |